US006776219B1

(12) United States Patent
Cornie et al.

(10) Patent No.: US 6,776,219 B1
(45) Date of Patent: Aug. 17, 2004

(54) CASTABLE REFRACTORY INVESTMENT MOLD MATERIALS AND METHODS OF THEIR USE IN INFILTRATION CASTING

(75) Inventors: James A. Cornie, Cambridge, MA (US); Maxim L. Seleznev, Belmont, MA (US); Brett M. Schulz, Boxborough, MA (US); Shiyu Zhang, Cambridge, MA (US)

(73) Assignee: Metal Matrix Cast Composites, Inc., Waltham, MA (US)

( * ) Notice: Subject to any disclaimer, the term of this patent is extended or adjusted under 35 U.S.C. 154(b) by 0 days.

(21) Appl. No.: 09/399,123

(22) Filed: Sep. 20, 1999

(51) Int. Cl.[7] ............................ B22C 9/00; B22D 19/00; B22D 27/15

(52) U.S. Cl. ...................... 164/516; 164/519; 164/61; 164/65; 164/97; 164/98; 164/120

(58) Field of Search ............................... 164/98, 91, 97, 164/99, 100, 103, 105, 108, 112, 34, 35, 36, 516, 519, 61, 65, 120

(56) References Cited

U.S. PATENT DOCUMENTS

| | | | |
|---|---|---|---|
| 3,722,574 A | 3/1973 | Anderson et al. | 164/41 |
| 4,312,398 A | 1/1982 | Van Blunk | 164/108 |
| 4,476,916 A | 10/1984 | Nusbaum | 164/519 |
| 4,617,979 A | 10/1986 | Suzuki et al. | 164/97 |
| 4,832,105 A | 5/1989 | Nagan et al. | 164/61 |
| 5,010,945 A | 4/1991 | Burke | 164/97 |

(List continued on next page.)

FOREIGN PATENT DOCUMENTS

| | | | | |
|---|---|---|---|---|
| EP | 0 834 366 A1 | * | 4/1998 | ........... B22D/19/14 |
| GB | 2 301 545 A | * | 12/1996 | ........... B22D/19/14 |

OTHER PUBLICATIONS

Mortensen et al. (1987) "On the Infiltration of Metal Matrix Composites," *Metallurgical Transactions A*, 18A: 1160–1163.

Mortensen et al. (1989) "Infiltration of Fibrous Preforms by a Pure Metal: Part 1. Theory," *Metallurgical Transactions A*, 20A: 2535–2547.

Mortensen et al. (1989) "Infiltration of Fibrous Preforms by a Pure Metal: Part 2. Experiment," *Metallurgical Transactions A*, 20A: 2549–2557.

Jonas et al. (1995) "Infiltration and Wetting of Alumina Particulate Preforms by Aluminum and Aluminum–Magnesium Alloys," *Metallurgical And Materials Transactions A*, 26A: 1491–1497.

Primary Examiner—M. Alexandra Elve
Assistant Examiner—Kevin P. Kerns
(74) Attorney, Agent, or Firm—Testa, Hurwitz & Thibeault, LLP

(57) ABSTRACT

Methods and materials for preparing investment molds useful in pressure infiltration casting of near net-shape metal or metal matrix composite (MMC) components. One embodiment of the invention includes disposing a slurry of an appropriately sized refractory material and a vehicle around a preform or fugitive pattern, removing the bulk of the vehicle, then curing/drying the refractory material to create an investment mold of the invention. Subsequently, pressure infiltration casting with a molten infiltrant using the investment mold permits infiltration of the mold cavity and/or preform without infiltration of the investment mold. As a result, the investment mold readily is removed to provide the near net-shape metal or MMC component. In other embodiments of the invention, a non-fugitive pattern is used, typically with a modified refractory cement of the invention. In these embodiments, the non-fugitive pattern is removed after formation of the investment mold to provide a suitable mold cavity which may be used to produce near net-shape metal or MMC components.

30 Claims, 6 Drawing Sheets

U.S. PATENT DOCUMENTS

| | | | |
|---|---|---|---|
| 5,052,463 A | | 10/1991 | Lechner et al. ............... 164/35 |
| 5,113,925 A | * | 5/1992 | Cook ........................... 164/35 |
| 5,119,864 A | * | 6/1992 | Langensiepen et al. ....... 164/97 |
| 5,197,528 A | | 3/1993 | Burke .......................... 164/97 |
| 5,204,055 A | * | 4/1993 | Sachs et al. ................... 419/2 |
| 5,234,045 A | * | 8/1993 | Cisko ........................... 164/97 |
| 5,297,609 A | | 3/1994 | Cook ........................... 164/35 |
| 5,322,109 A | * | 6/1994 | Cornie ......................... 164/97 |
| 5,340,656 A | * | 8/1994 | Sachs et al. ................. 428/546 |
| 5,387,380 A | * | 2/1995 | Cima et al. .................... 264/69 |
| 5,394,930 A | * | 3/1995 | Kennerknecht ............ 164/112 |
| 5,487,420 A | * | 1/1996 | Newkirk ...................... 164/97 |
| 5,490,882 A | * | 2/1996 | Sachs et al. .................... 134/1 |
| 5,511,603 A | * | 4/1996 | Brown et al. ................. 164/97 |
| 5,524,696 A | * | 6/1996 | Osborne et al. ............... 164/34 |
| 5,553,657 A | * | 9/1996 | Aghajanian et al. .......... 164/97 |
| 5,553,658 A | * | 9/1996 | Cornie ......................... 164/97 |
| 5,649,585 A | | 7/1997 | Nolte et al. ................... 164/10 |
| 5,983,973 A | * | 11/1999 | Cornie ......................... 164/97 |
| 6,148,899 A | * | 11/2000 | Cornie et al. ................. 164/65 |
| 6,360,809 B1 | * | 3/2002 | Cornie et al. ................. 164/65 |

\* cited by examiner

CASTABLE REFRACTORY INVESTMENT MOLD MATERIALS AND METHODS OF THEIR USE IN INFILTRATION CASTING

This invention was made with government support under Grant No. N00167-98-C-0058 awarded by the Department of the Navy. The government has certain rights in the invention.

FIELD OF THE INVENTION

The present invention relates to methods and materials for forming near net-shape metal and metal matrix composite components. More specifically, the invention relates to methods of infiltration casting using investment molds to produce near net-shape metal and metal matrix composite components.

BACKGROUND OF THE INVENTION

Infiltration casting, and in particular pressure infiltration casting, is a widely used method for manufacturing net-shape metal and metal matrix composite (MMC) parts. Methods for MMC parts typically involve placing a ceramic preform material into a machined mold cavity, placing the mold into a mold vessel, then evacuating the mold vessel to create a reduced pressure in the mold cavity. Subsequently, a molten metal is introduced on top of or around the mold cavity to seal it from the surrounding atmosphere, then forcing the molten metal with external pressure into the mold cavity and ceramic preform. After the molten metal solidifies, a net-shape MMC part is mechanically extracted from the mold.

The molds for pressure infiltration casting of ceramic preforms usually are machined graphite or steel. Machining graphite or steel molds into complex or intricate shapes is an extremely expensive and laborious process. Moreover, both steel and graphite molds can be used only a limited number of times before being rendered unuseable due to surface wear and erosion. In addition, the high cost of quality graphite drives production costs even higher. Therefore, the mold-making stage of an infiltration casting manufacturing process tends to make MMC production technology economically prohibitive and inflexible.

An alternative to using expensive mold tooling is a "moldless" process, such as sand or investment casting techniques, where a preform is supported by sand or an investment material which encases the preform. However, these technologies typically cannot be applied directly to pressure casting. Since sand and investment materials used in these processes usually are porous, upon application of external pressure to a molten metal, the sand or investment mold material usually is infiltrated along with the ceramic preform. Consequently, a continuous MMC part and investment material body is formed, making it nearly impossible to extract a net-shape MMC part.

To avoid infiltration of the investment compound, a refractory or gas impermeable shell mold may be used. However, castable refractory or gas impermeable shell molds typically are hard, making removal of the cast part from the investment mold difficult without damaging the MMC part. This alternative is complicated further when a complex component having detailed and/or fine features is the ultimate goal. A further concern is the cost of mold materials themselves, which is appreciable. Moreover, state-of-the-art mold casting technologies do not lend themselves to recycling the mold materials, thereby increasing the cost of the resulting metal or MMC parts.

Although a technique has been described whereby a self-supporting preform is encased by an investment mold material, the method involves sintering the preform during curing of the investment mold. See, e.g., U.S. Pat. Nos. 5,234,045 or 5,297,609 to Cook et al. Sintering of the preform ceramic particulates while curing the investment mold material may be unnecessary and/or undesirable, e.g., requiring excessively high temperatures, and/or changing the porosity of the preform, e.g., reducing the porosity which may affect removal of fugitive materials and/or water of hydration, and/or modifying the pattern of the net-shape mold cavity.

Although commercially available refractory cement materials have certain desirable properties, e.g., low coefficient of thermal expansion (CTE), low shrinkage during the high temperature of the casting process, and a smooth surface, most are not useful in pressure infiltration processes since these refractory cement materials are too porous and are infiltrated by molten metals during pressure infiltration casting. In addition, these materials often are sintered during high temperature casting processes.

Accordingly, there is a need for a simple and reliable pressure infiltration casting method similar to conventional sand or investment casting processes, which allows easy extraction of near net-shape metal or MMC components by preventing infiltration of a molten metal under external pressure into the investment mold.

SUMMARY OF THE INVENTION

It has been discovered that near net-shape metal or metal matrix composite (MMC) components can readily be produced without expensive machined tools by using investment casting materials and molds of the invention. When combined with a net-shape preform or fugitive mold pattern, the investment casting methods of the invention are TOOL-LESS MOLD™ casting processes. By eliminating the need for expensive machined tools, a cost effective manufacturing process is realized which enables rapid prototype production as well as an economically feasible way to produce metal or MMC components in mass. Such methodology is widely applicable, and is especially suitable for automotive, engine, and aerospace applications where the demands for complex shapes and low manufacturing costs are high. Methods of the invention also include producing near net-shape metal or MMC components using modified conventional investment mold materials such as ceramic cements.

In a broad embodiment directed to MMC parts, a method of the invention for forming a MMC component includes the steps of (i) providing a net-shape preform of the MMC component to be cast; (ii) forming an investment mold of a refractory material around the preform; (iii) infiltrating the preform with a metal, to the exclusion of the investment mold, using an infiltration casting process, e.g., the Advanced Pressure Infiltration Casting (APIC™) process; (iv) solidifying the metal; and (v) removing the investment mold material to provide the final MMC part.

In other embodiments, a net-shape pattern, adjacent to a pre-gate, is positioned in a container to which is added a refractory material. The powdered refractory material, which often includes a vehicle, is disposed around the pattern, e.g., a preform, and at least a portion of the pre-gate. Subsequently, in preferred embodiments, the vehicle is removed from the container to create a dried, packed particulate refractory material, i.e., an investment mold which defines a mold cavity containing a preform, if present. In addition, the pre-gate is removed to form a gate which is in fluid communication with the pattern. A molten metal is introduced into the container and forced into the mold cavity (and a preform) through the gate, but not into the investment mold. After infiltration of the mold cavity (and preform) is complete, the molten metal is cooled and the investment mold is removed to afford the metal or MMC part having the shape of the pattern.

In another embodiment of the invention, commercially available castable refractory cement materials, e.g., Ceredyne CASTABLE 220 (THERMO-SIL CASTABLE 220) (Ceredyne Inc., Scottdale, Ga.), may be modified to produce investment molds useful in the practice of the invention. The addition of a non-corrosive liquid soluble refractory material such as magnesium oxide to commercially available castable refractory cements can overcome their deficiencies for use as an investment mold material. Magnesium oxide is soluble in non-corrosive solvents such as water, and is stable to high temperature applications often encountered during pressure infiltration casting, i.e., it does not decompose at high temperatures and does not interact with molten metals. As a result, the modified ceramic cement may be used as an investment mold material since it readily can be separated from the cast part.

Another aspect of the invention is a reusable investment mold which preferably is formed from a slurry of a vehicle and a refractory material. The reusable investment mold of the invention particularly is suited for practicing methods of the invention. Preferably, the investment mold is made of fine particulates of refractory materials which are closely packed to produce a dense, low porosity investment mold. The vehicle preferably is water, water with an organic or inorganic additive, or an organic solvent such as an alcohol. The refractory materials preferably are alumina, silica, magnesia, or feldspar. The average particle size of the refractory materials preferably are on the order of about one micron or less.

Reference to the figures herein is intended to provide a better understanding of the methods and apparatus of the invention but are not intended to limit the scope of the invention to the specifically depicted embodiments. The drawings are not necessarily to scale, emphasis instead being placed upon illustrating the principles of the invention. Like reference characters in the respective figures typically indicate corresponding parts.

It should be understood that the order of the steps of the methods of the invention is immaterial so long as the invention remains operable, i.e., e.g., a net-shape pattern of the final cast part must be provided prior to formation of the investment mold. In addition, an investment mold, optionally containing a preform, must be created prior to infiltration of a molten infiltrant into the mold cavity of the investment mold. Moreover, two or more steps may be conducted simultaneously.

The foregoing, and other features and advantages of the invention, as well as the invention itself, will be more fully understood from the description, drawings, and claims which follow.

BRIEF DESCRIPTION OF THE DRAWINGS

In FIG. 1, the average particle size of the investment mold is less than the average particle size of the preform.

FIG. 2A is a preform of an engine connecting rod. FIG. 2B is a preform of a gear.

DETAILED DESCRIPTION OF THE INVENTION

Figure 1:
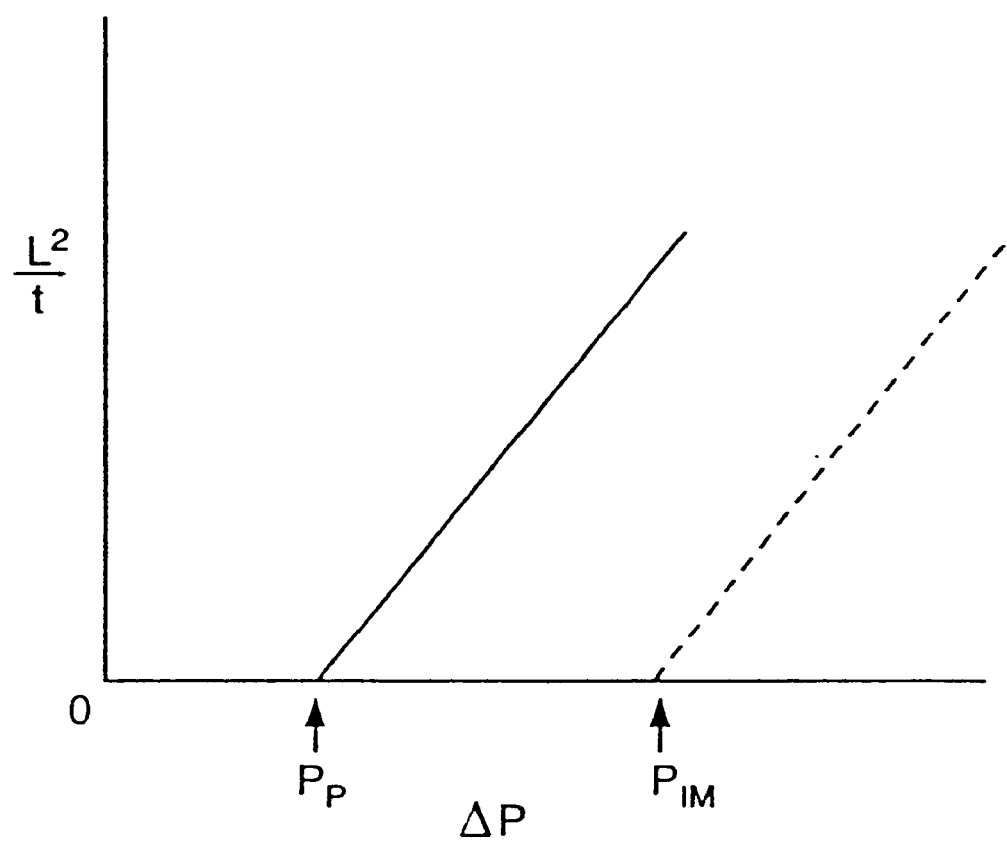
FIG. 1 is a schematic graph of the pressure differential (AP) required to initiate infiltration of a molten infiltrant into a packed bed of particles versus the square of the length of the packed bed divided by time ($L^2/t$). The solid line trace represents a preform, and the dashed line represents an investment mold. Point "$P_P$" is the pressure breakthrough point for a preform, and the point "$P_{1M}$" is the pressure breakthrough point for the investment mold.

Near net-shape metal or metal matrix composite (MMC) components can be produced without using expensive machined tools by using investment casting materials and molds of the invention. When used in combination with a net-shape preform or fugitive mold pattern, the investment casting methods of the invention are TOOL-LESS MOLD™ casting processes. By eliminating the need for expensive tools, a cost effective manufacturing process is realized which enables rapid prototype production as well as an economically advantageous technique to produce mass metal or MMC parts.

Such methodology is widely applicable, and especially is suitable for automotive, engine, and aerospace applications where the demands for complex shapes and low manufacturing costs are high. For example, in the production of MMC components, it is estimated that a one square meter three-dimensional printing bed for producing net-shape preforms used in combination with the infiltration casting techniques disclosed herein are capable of supplying the connecting rods for an annual 300,000 six cylinder engine production line. Moreover, cost modeling demonstrates that for this high production rate, the cost per connecting rod would be the lowest of any casting process.

As used herein, "pressure infiltration casting" is understood to mean any casting process where an externally applied pressure is used to facilitate infiltration of a mold cavity, optionally containing a preform. Examples of pressure infiltration casting include, but are not limited to, pressure infiltration casting such as the Advanced Pressure Infiltration Casting (APIC™) process as described in U.S. Pat. Nos. 5,322,109; 5,553,658; and 5,983,973; high throughput pressure infiltration casting as described in International Application No. PCT/US99/01833 (WO 99/38630); squeeze casting; and die-casting.

As used herein, "net-shape" is understood to mean a composition which is within industry standards of the final cast component so that after formation of the cast component, additional machining is unnecessary except where surfaces are required be mated or matched to other materials; holes, passages, special apertures, or bores are required, e.g., screw bores and/or threadings; and/or complex cavities are required, each of which usually is unachievable by normal casting means. In addition, the surface area where a gate, a sprue system, and/or other supporting materials of a metal or MMC component are present may require a small amount of machining to produce the final net-shape component. Preferably, a net-shape is within about ±0.05 inches (in), or about ±0.01 in, of the final shape of the cast component. More preferably, a net-shape is within about ±0.005 in, or about ±0.001 in, of the final shape of the cast component.

As used herein, "an infiltrant" may be any composition of matter which is solid at ambient temperature and is capable of being transformed into a liquid, typically homogenous in nature. An infiltrant commonly refers to a metal or metal alloy. However, an infiltrant also may be a salt, a glass, or various resin materials.

As used herein, "metal" is understood to mean a metal or metal alloy. Examples of common metals or metal alloys are, among others, aluminum, aluminum alloys, bronze, beryllium, beryllium alloys, chromium, chromium alloys, cobalt, cobalt alloys, copper, copper alloys, gold, iron, iron alloys, steel, magnesium, magnesium alloys, nickel, nickel alloys, lead, lead alloys, copper, tin, tin alloys such as tin-bismuth and tin-lead, zinc, zinc alloys, superalloys such as International Nickel 100 (IN-100) or International Nickel 718 (IN-718), and combinations thereof.

As used herein, "molten infiltrant," liquid infiltrant," "molten metal," or "liquid metal" is understood to mean a respective material which is at least at or above about its liquidus temperature.

As used herein, "a non-wettable material" is understood to mean a material which has a contact angle greater than 90° when a droplet of a liquid infiltrant rests on a polished surface of the material.

As used herein, "refractory material" is understood to mean any refractory material useful in the practice of the invention. A refractory material preferably is spontaneously non-wettable by a molten metal under a defined external pressure when used as an investment mold material. Examples of refractory materials include, but are not limited to, alumina, calcined alumina, bauxite, calcined bauxite, silica, titania, zirconia, magnesium oxide, manganese oxide, iron oxide, chromium oxide, kaolin, calcined kaolin, graphite, feldspars, clay, wollastonite, and combinations thereof.

As used herein, "a slurry" is understood to mean a mixture of a solid material, e.g., a refractory material, in a liquid, e.g., a vehicle, which is flowable. Preferably the amount of solids in a slurry is less than about 60% by weight, or less than about 45% by weight. More preferably, the amount of solids in a slurry is less than about 35% by weight. A slurry may be a cement slurry.

As used herein, "a cement slurry" is understood to mean a mixture of a solid material, e.g., a refractory material, in a minimal amount of liquid, e.g., a vehicle, to provide a flowable mixture. Preferably, the amount of vehicle in a cement slurry is less than about 55% by weight, or less than about 45% by weight. More preferably, the amount of vehicle in a cement slurry is less than about 35% by weight. A cement slurry may be a hydrated material or materials. A cement slurry may be a slurry.

As used herein, "packed refractory material" is understood to mean a bed of a refractory material which has a porosity which is compatible with the practice of the invention. That is, the porosity of a packed refractory material preferably is of a dimension such that a mold cavity and/or preform within the mold cavity is infiltrated with a molten infiltrant while the packed refractory material is uninfiltrated with the molten infiltrant. The porosity of a packed refractory material may be determined by known methods, e.g., mercury porosimetry.

As used herein, "dried refractory material" is understood to mean a refractory material which has less than about 3% liquid content therein. Preferably, a dried refractory material has less than about 1%, or less than about 0.5% liquid content therein. More preferably, a dried refractory material has less than about 0.01% liquid content therein. A dried refractory material typically is free of water of hydration.

As used herein, "average particle size" is understood to mean the average diameter of the particles, particulates, powders and/or materials to which such term is applied. Average particle size typically is measured using standard industry techniques and instrumentation such as, e.g., passing the particles through various sized mesh screens. Other techniques include light scattering using a laser scattering particle size distribution analyzer (e.g., from Horiba Instruments), direct measurement using scanning electron microscopy, transmission electron microscopy or visual microscopy.

As used herein, "investment material," "investment mold material," and "refractory material" may be used interchangeable, although an investment material and an investment mold material typically refer to a refractory material in the presence of a vehicle, i.e., a slurry or a cement slurry of the refractory material.

As used herein, "fugitive" is understood to mean substantially removable, i.e., removable to a great extent.

As used herein, "preform" is understood to mean a metal or ceramic material such as, e.g., an oxide, a boride, a nitride, a carbide or a form of carbon which is to be infiltrated with an infiltrant of the invention. Most preforms used in the practice of the invention are recognized by one skilled in the art. See e.g., U.S. Pat. Nos. 5,511,603 to Brown et al.; and U.S. Pat No. 5,322,109 and U.S. Pat. No. 5,553,658 to Cornie; and Oh, S-Y. et al. (1989) Metallurgical Transactions A, 20A:527–532; Oh-S-Y. et al. (1989) Metallurgical Transactions A, 20A:533–541; Mortensen, A. et al. (1989) Metallurgical Transactions A, 20A:2535–2547; Mortensen, A. et al. (1989) Metallurgical Transactions A, 20A:2535–2557; Cornie, J. A. et al. (1991) "Pressure Infiltration Processing of P-55 (Graphite) Fiber Reinforced Aluminum Alloys," in Ceramic TRANSACTIONS, Advanced COMPOSITE MATERIALS, M. D. Sacks, ed., 19:851–875 (The American Ceramic Society, Inc., Westerville, Ohio); and Cook, et al. (1991) Materials SCIENCE AND ENGINEERING, A144:189–206. Infiltration of a preform by a molten metal followed by solidification produces a metal matrix composite (MMC).

As used herein, "a pattern" is understood to mean a representative sample or model of a final cast part which is made of a fugitive or non-fugitive material that is solid at ambient temperature. A pattern may be a preform. However, a pattern also may be made of, e.g., a metal such as steel or aluminum, a wax, a silicone, a rubber, plastics such as polystyrene or acrylics, glass, and combinations thereof.

As used herein, "a container" is understood to mean any shape or dimensioned receptacle that is capable of holding a refractory material which may completely surround a preform or pattern. Preferably, the interior volume of a container is sufficient to hold a refractory material completely surrounding a preform or pattern, and at least a portion of any pre-gates, pre-sprue systems, and/or pattern supports associated therewith. A container may be constructed entirely of solid materials such as a metal, rubber, a plastic, or wood. However, a container also may have a porous aspect, e.g., a filter or perforated section, associated with it to permit liquids to drain or be forced from the interior of the container. In addition, a container may be constructed or be associated with a material which has a high affinity for water, e.g., plaster or gypsum, or other vehicles. Often a container will have an open end, but it also may provide limited access to the interior of the container, e.g., through a port. A container may be a mold vessel which is made of a material that is capable of withstanding the evacuation, heating and pressurization of infiltration casting techniques used in the practice of the invention.

It should be understood that the materials and methods of the invention equally are applicable to the formation of near net-shape MMC components as well as near net-shape metal components. That is, rather than using a preform to form a mold cavity within an investment mold material, a net-shape pattern of the final cast part may be made of a fugitive material such as wax to form the mold cavity within the investment mold material. In these embodiments, the fugitive material is removed to provide an investment mold having a mold cavity in the desired net-shape of the final metal or MMC component.

In addition, a non-fugitive near net-shape pattern of the final cast part may be used to provide a mold cavity in an investment mold of the invention subsequent to removal of the non-fugitive pattern from the investment mold. However, preferred metal-containing components are MMC components. Accordingly, for brevity and clarity, the following description mainly is directed to making MMC components using TOOL-LESS MOLD processes, except for discussions relating to other particular embodiments. However, the concepts and principles taught and described herein are applicable to the manufacture of any net-shape metal or MMC component which is within the scope of the claims herein.

Preparation of a Pattern

Preforms are preferred in the practice of the invention. Many methods for forming preforms are known in the art. Several permit the formation of net-shape preforms which are preferred in the practice of the invention. For example, net-shape preforms may be made by processes which include, among others, three-dimensional printing, injection molding such as powder injection molding, powder pressing into a die, slurry casting into a mold, e.g., slip casting, and machining. Certain preforms may require use of more than one of the above techniques. The materials of which a preform is made may be sintered to assist in producing a self-supporting body. Three-dimensional printing is the preferred technique. In particular, the technology developed at the Massachusetts Institute of Technology is more preferred. See, e.g., U.S. Pat. Nos. 5,204,055 and 5,340,656 to Cima et al.; U.S. Pat. No. 5,387,380 to Brancazio et al.; and U.S. Pat. No 5,490,882 to Bredt et al.; and europeon Patent No. 0 686 067 to Brancazio et al.

Preforms also may contain regions of machinable materials, e.g., machinable metals. Incorporation of a machinable material into the preform permits subsequent processing of the MMC component after the casting process. For example, in certain MMC parts, a threaded bore, aperture, or other detailed feature may require machining which usually is not achievable by casting of such parts, irrespective of providing a net-shape component. Accordingly, easily machined materials such as, e.g., austenitic or ferritic steel, or titanium, can be inserted into a preform prior to formation of the investment mold. After recovery of the cast part, the inserted machinable materials readily are able to be manipulated into the desired configurations or shapes, e.g., threads, ports, bores, and/or matching or mating surfaces.

In addition, a preform may be filled with a fugitive material such as a wax. In this way, the porosity of the preform is minimized during the initial stages of investment mold formation process, e.g., while a slurry of refractory material is poured around the preform. In addition, a wax-filled preform provides a more robust pattern which readily may be handled or transported for further processing.

Other patterns may be used in the practice of the invention. In certain embodiments, a fugitive pattern may be used. Fugitive patterns, typically made of a wax, a fugitive plastic such as polystyrene, or other oxidizable materials, are removed during the preparation of the investment mold to leave behind a mold cavity in the shape of the pattern. Subsequently, the mold cavity may be filled with a preform material or left void, thereby permitting a MMC or metal component, respectively, to be produced.

In addition, a pattern may be constructed of a non-fugitive solid material, e.g., a rubber or metal, which is removed during or after formation of the investment mold. In these embodiments of the invention, a cement slurry of a modified commercially available refractory material preferably is used to produce the investment mold. As with a fugitive pattern, the resulting mold cavity may be filled with a preform material or left void to produce a MMC or metal component, respectively.

Prior to positioning a pattern in a container to form an investment mold, the pattern may be surface-treated, e.g., by slip casting a finer textured particulate material over the exterior surface of the pattern to provide a smoother finish to the final component. In addition, a pattern may be coated with a fugitive or oxidizable material such as a wax or a fugitive polymeric material, e.g., polymethylmethacrylate or polystyrene. This coating may facilitate a smoother surface and/or prevent contamination of the interior of a porous pattern, e.g. a preform, during the formation of the investment mold.

A pattern also may be coated with a parting compound or mold release agent (mold wash) such as colloidal carbon, e.g., colloidal graphite. The mold release agent may be applied to a pattern either alone, or subsequent to slip casting and/or coating with a fugitive material. The pre-gates typically are coated with one or more of the above-mentioned coatings as well. In preferred embodiments, a pre-gate may be attached to a parting compound present on a preform which assists in creating a net-shape MMC component since the parting compound is sufficiently porous to permit infiltration of the preform yet remains present to allow the solidified infiltrant in the gate to be snapped or cut off to provide a near net-shape MMC component.

For aluminum alloy and magnesium alloy castings, the mold release agent preferably is one or more layers of colloidal carbon, e.g., colloidal graphite or boron nitride, which is dispersed in a suitable volatile vehicle. However, other ceramic slurry coatings may be used.

For bronze and copper castings, contamination of the bronze or copper by the investment mold may be prevented by using an appropriate mold release agent, e.g., a slurry of zirconium oxide in a slightly acidic vehicle sold under the trade name ZIRCWASH™. Other parting compounds may be used as mold release agents or washes such as boron nitride or graphite foil.

Figure 2A:
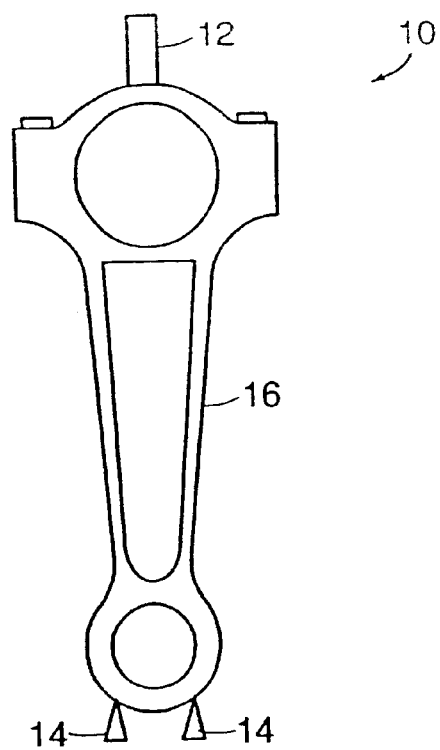
FIGS. 2A and 2B are cross-sectional schematic views of embodiments of net-shape patterns prior to formation of an investment mold of the invention.
Figure 2B:
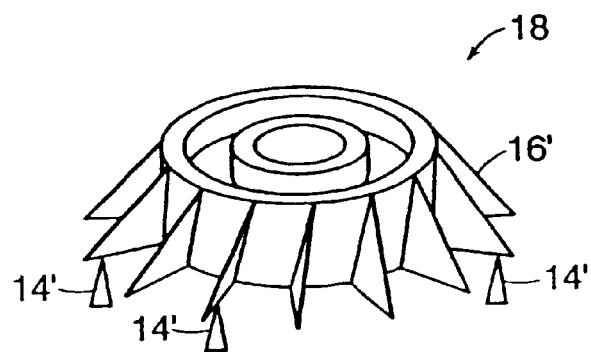

In a preferred embodiment shown in FIG. 2A, a preform 10, which is a fabricated self-supporting ceramic particulate preform, is connected to a pre-gate 12. The pre-gate provides the means to maintain fluid communication between the preform and a subsequently introduced molten metal after formation of an investment mold around the preform. The pre-gate typically is a material that is a fugitive material, e.g., a fugitive resin, wax, or oxidizable material, which is removed in the outgassing and drying/curing of the investment material to form the investment mold. However, the pre-gate may be any material which may be removed, e.g., mechanically, subsequent to or during the formation of the investment mold, i.e., prior to infiltration of the preform with a molten metal. The pre-gate often is polystyrene, but also may be an acrylic material or an oxidizable plastic, such as polycarbonate or polypropylene, among other materials. Preferably, the pre-gate is held adjacent the preform using an appropriate attaching material such as a glue, e.g., a primarily toluene glue, DUCO™ cement, SUPERGLUE™, or CRAZY GLUE™.

Again referring to FIG. 2A, the preform 10 often is attached to preform supports 14, typically using a glue material similar to the connection of the pre-gate 12 to the preform 10. The preform 10 typically has a mold release coating 16 thereon, which may be over a fugitive coating (not shown). The preform (or pattern) supports are used to support the preform (or pattern) above the bottom of a container, which may contain a filter, during formation of the investment mold. Pattern supports permit the investment mold material to surround the pattern to define a mold cavity which may be evacuated. Pattern supports and/or pre-gate(s) may be placed adjacent a pattern prior to introduction of the pattern to a container used for forming the investment mold. However, the pattern supports may be positioned within the vessel prior to positioning the pattern in the vessel. Similarly, the pre-gate(s) may be attached subsequent to positioning the pattern(s) within the container.

As with the pre-gate(s), the pattern supports may be removed during the outgassing and drying/curing of the investment mold material if constructed of a fugitive material. In these embodiments, the small void volume of the removed pattern supports typically are infiltrated with molten infiltrant and easily may be freed from the final cast part. Alternatively, the preform supports may remain within the investment mold during the pressure infiltration casting process. In these embodiments, the pattern supports may be constructed of a dense material, e.g., metal, which prevents metal infiltration of the pattern supports as well as forming intimate contact with the investment mold to prevent metal infiltration between the investment mold and pattern supports. However, the pattern supports preferably are a refractory or ceramic material that permits molten infiltrant to fill the pattern supports which readily are removed.

The contact point or surface between a pattern and pattern supports preferably is minimized so that a net-shape metal or MMC component is produced with the surface finish of the investment mold rather than having a surface area which has the texture of the preform support. In these embodiments, a triangular pattern support is preferred. However, other shapes of pattern supports may be used, especially with fugitive pattern supports. An example, among others, is polystyrene beads.

Preparation of a non-fugitive solid pattern typically is similar to the preparation of a fugitive pattern or preform as described above. However, a non-fugitive solid pattern usually does not have pre-gate(s) or pattern support(s) attached thereto since the non-fugitive solid pattern should be a shape which can be removed from the investment mold material at an appropriate time to provide a corresponding mold cavity in an unfragmented investment mold.

Preparation of the Investment Mold Material

Since the refractory materials used to form an investment mold of the invention typically are spontaneously non-wettable by a molten metal under a defined external pressure, an average particle size of the refractory material can be selected which will prevent molten metal infiltration of the investment mold at a defined infiltration casting pressure.

An expression for the minimum pressure required to initiate infiltration of a packed bed of particulates of a given size with a liquid metal typically is given as $$P=6V_f(\sigma_{PL}-\sigma_{PA})/(1-V_f)d_f$$

where $\sigma_{PL}$ is the particle/liquid interface energy, $\sigma_{PA}$ is the particle/atmosphere interfacial energy, $V_f$ is the volume fraction of the particles, and $d_f$ is the diameter of the particles. See, e.g., Mortensen, A. et al. (1989) Metallurgical Transactions A, 20A: 2535–47; Mortensen, A. et al. (1989) Metallurgical Transactions A, 20A: 2549–57; Jonas, T. R. et al. entitled, "Infiltration and Wetting of Alumina Particulate Preforms By Aluminum and Aluminum-Magnesium Alloys," in Metallurgical Transactions A, in press, June 1994; and Mortensen, A. et al. (1987) Metallurgical Transactions A, 18A: 1160.

In any imperfectly or non-wetting system, the particle/liquid interface energy is greater than the particle/atmosphere interfacial energy (i.e., $\sigma_{PL}>\sigma_{PA}$). Accordingly, without wishing to be bound to any particular theory, it is believed that a particle size may be chosen which is small enough such that a given applied external pressure on a liquid infiltrant is insufficient to overcome the capillary forces within a packed bed of particles so that the packed bed is uninfiltrated by the liquid infiltrant. That is, a packed bed of particles which is used as an investment mold may be uninfiltrated while a void mold cavity or a mold cavity containing a sufficiently porous preform completely is infiltrated by the liquid infiltrant.

FIG. 1 is a schematic graph showing the pressure differential ($\Delta P$) required to initiate infiltration of a molten infiltrant into a packed bed of particles, e.g., a preform or an investment mold, versus the square of the infiltrant length into the packed bed of particles divided by time ($L^2/t$). The point at which the traces cross the x-axis is the breakthrough point of the molten infiltrant into the packed bed of particles. In FIG. 1, the solid line represents a preform and the dashed line represents an investment mold. Accordingly, the pressure breakthrough points for a preform and an investment mold are labeled $P_P$ and $P_{1M}$, respectively. As stated above, the breakthrough point is the pressure at which the capillary forces within the porosity of the packed bed of particles are overcome, thereby permitting infiltration of the packed bed, if the pressure is great enough. The pressure differential generally increases in proportion to the inverse of the diameter of the particles in the packed bed. Consequently, the breakthrough point may be manipulated by use of the appropriately sized particles with which to construct the packed bed.

Consequently, using a refractory material with a smaller particle size than the particles used to make the investment mold, the breakthrough points of each material can be exploited so that the preform can be completely infiltrated with molten metal to the exclusion of the investment mold. For example, practical experience has shown that molten aluminum will not infiltrate a packed bed of alumina particles ($V_f$~0.55) if the average particle size is less than about 1 micron ($\mu$m) and the differential pressure between the metal and the evacuated alumina bed does not exceed 1300 pounds per square inch (psi). Thus, by proper selection of the resulting porosities of the preform and investment mold, a working external pressure can be determined to ensure complete infiltration of the preform while the investment mold remains substantially metal-free.

It should be understood that using the above-defined relationship, a sufficient breakthrough pressure differential can be obtained using an investment mold made of a refractory material which may be spontaneously wettable, yet not within a time which would permit infiltration of the investment mold. Moreover, complete filling a void mold cavity will require a decreased pressure differential to provide a near net-shape metal component. Such techniques also are within the scope of the invention.

Practically, for a particulate preform having an average particle size of about 13 $\mu$m, a pressure differential of about 200 psi or more affords a net-shape MMC component. Preferably, a pressure differential of about 600 psi or more, or more preferably, 800 psi or more is used in the practice of the invention. It should be understood, however, that the difference in breakthrough pressures is a compromise between a large difference where greater external pressures may be used without fear of infiltration of the investment mold, and the selection of investment/refractory materials and their relative sizes. Not only must the theoretical aspect infiltration be considered, but also the economics of producing the MMC components.

In making a metal or MMC part, the metal which is to be used in casting typically is selected first. The metal used to form the final cast part influences the conditions of the casting process such as the casting temperatures. The conditions of the casting process, in turn, typically affect the choice of refractory material used to construct the investment mold since certain refractory materials are more stable at higher temperatures than others. Moreover, the refractory material should be relatively non-reactive with the infiltrating molten metal. For example, if the final cast component is composed of a high melting point metal, e.g., a copper alloy, then the refractory material preferably is, among others, magnesium oxide (MgO), yttrium oxide ($Y_2O_3$), zirconium oxide ($ZrO_2$), or zirconium silicate.

In addition to the refractory materials described in the above definitions section and those known in the art, the following specific refractory materials are included within those materials useful in the practice of the invention: submicron calcined alumina, preferably with an average particle size of 0.5 $\mu$m or less; 1 $\mu$m calcined alumina from Electroabrasives (Buffalo, N.Y.); 1 $\mu$m alumina from Micro-Abrasives Corp. (Westfield, Mass.); 1 $\mu$m alumina from K.C. Abrasive (Kansas City, Kans.); 0.50 $\mu$m alumina from Condea Vista Co. (Tucson, Ariz.); EKP Clay from Feldspar Corp. (Edgar, Fla.); calcined kaolin such as SNOWTEX 45 from U.S. Silica Company (Berkeley Springs, W.Va.); wollastonite, a triclinic mineral including native calcium silicate, preferably having about 3.5 $\mu$m average equivalent spherical diameter (ESD) from NYCO Minerals, Inc. (Calgary, Alberta, Canada); and magnesium oxide, preferably having about 0.8 $\mu$m average ESD from Martin Marietta Magnesia Specialties (Baltimore, Md.).

After selection of the refractory material, the appropriate average particle size of the refractory material may be determined as described above or based on practical experience, which may include trial and error experimentation depending on the variables of the particular application. Practically, the average particle size of the refractory material typically is less than or equal to about 6 $\mu$m. The average particle size of the refractory material preferably is less than or equal to about 3 $\mu$m, or less than or equal to about 2 $\mu$m. More preferably, the average particle size of the refractory material is less than or equal to about 1 $\mu$m. The average particle size of the refractory material is one of the more important factors in the practice of the invention.

The average particle size of the refractory material often is at least a factor of about two or less than the average particle size of the preform. Of course when an investment mold of the invention is used to cast a metal part, infiltration of the patterned mold cavity is more easily accomplished. As a result, the average particle size of the refractory material may be larger and/or lower infiltrating pressures may be used. However, to produce net-shape metal components, neither of these factors can be compromised greatly.

The investment molds of the invention preferably are prepared using a slurry of a refractory material and a vehicle. Use of a fluid vehicle permits the refractory material readily to be disposed around the perform or pattern, making intimate contact with nearly the entire surface and intricate features of the preform or pattern. Although the description focuses on the embodiment using a slurry, it should be understood with an appropriately shaped preform or pattern and the proper conditions, which may include a form of agitation, an investment mold of the invention may be formed without the use of a slurry, i.e., via dry packing. Vehicles useful for mixing with a refractory material to form a slurry include, but are not limited to, water, organic solvents such as an alcohol, e.g., methanol or ethanol, and combinations thereof. An organic and/or inorganic additive may be present in the vehicle.

For purposes of recovery, the refractory material usually is not coated with a binder. However, in certain applications, use of a binder is preferred. If a binder is used, the binder preferably is a fugitive material which is removed during formation of the investment mold. The binder also may be a solvent or water soluble material such as a salt. The refractory material also may be coated with a material to prevent the particulate refractory material from being sintered together during the casting process. However, in certain applications, the refractory materials used to form the preform may be sintered together prior to positioning in a container and/or formation of the investment mold.

In forming a slurry, a refractory material typically is dispersed in an appropriate vehicle in an amount from about 5% to about 90% by weight. Preferably, the refractory material is present in the vehicle from about 10% to about 70% by weight. More preferably, the amount of refractory material in the vehicle is from about 15% to about 40% by weight. However, it should be understood that the amount of refractory material in a vehicle which provides a workable slurry, e.g., a flowable slurry, depends on many factors such as average particle size of the refractory material, pH of the mixture, viscosity of the mixture, and the degree of flocculation.

It may be desirable in certain cases to alter the properties of the mixture after the refractory material is dispersed into the vehicle, e.g., pH which may affect the degree of flocculation. See Example 1C below. That is, the pH (or other properties of a slurry) may affect the attraction of the particulates within the slurry to each other among other influences. In certain applications, an increased level of flocculation may be desired since flocculated particulates are more easily deformable around a pattern, e.g., in cored areas. In other applications, no flocculation is needed or desired. Yet in some preferred applications, a flocculated slurry initially is added around a pattern, then a relatively lesser flocculated or deflocculated slurry is added where the particulates repel each other to a greater extent and the natural packing during drying/curing of the particulates is used to provide an investment mold of the invention. In addition, suspensions of refractory materials may be tested for casting rate, resulting compact density (porosity), shrinkage, and infiltration of the compacted material to determine whether the material is suitable for infiltration casting at the temperature and pressures which practically will be used in the particular process.

In the preparation of a cement slurry, a lesser amount or no vehicle is used. These embodiments typically include castable refractory materials which are commercially available that are modified by the addition of a non-corrosive solvent soluble refractory material, e.g., magnesium oxide. Commercially available refractory materials typically are coarse particulates which when prepared for casting have the consistency of about concrete.

Formation of the Investment Mold

Subsequent to preparation of a pattern, e.g., preform, with optional coatings, one or more patterns are positioned within a container (or mold vessel) to permit formation of the investment mold having a mold cavity or mold cavities which contain the pattern(s). The throughput of final cast components obviously is increased when more than one mold cavity (including preform) is infiltrated in a casting cycle and thus, is preferred.

Figure 3A:
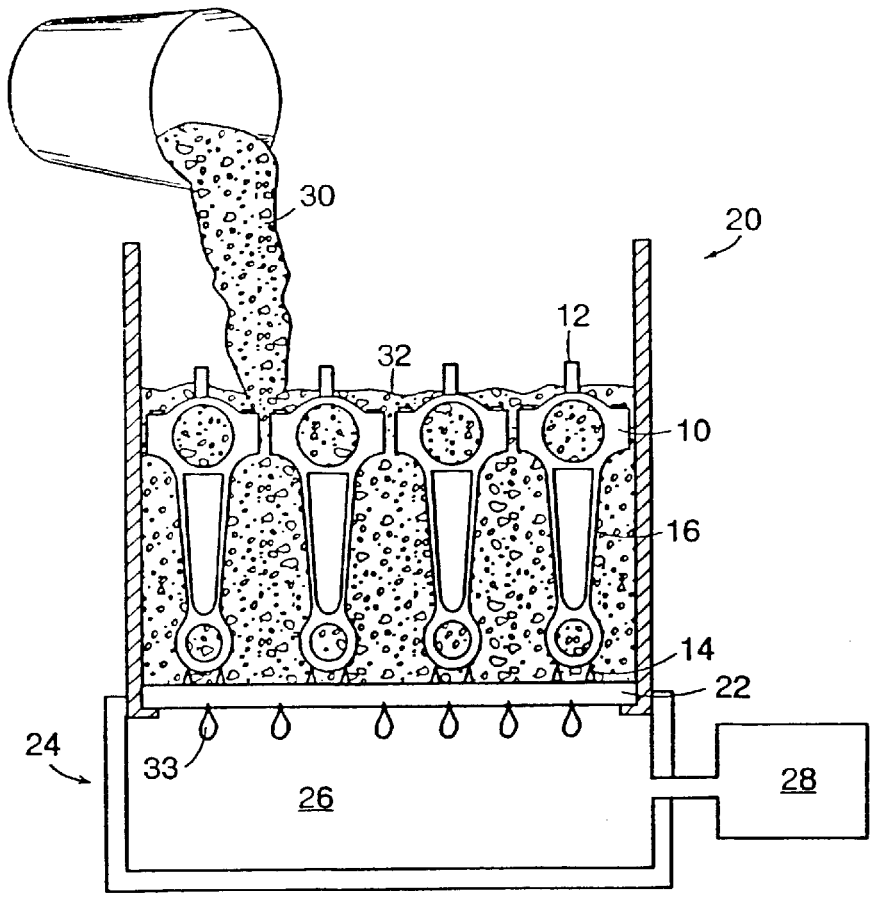
FIGS. 3A and 3B are cross-sectional schematic views of the patterns of FIGS. 2A and 2B, respectively, positioned within a container during the charging of a slurry of an investment mold material therein.

Referring to a preferred embodiment depicted in FIG. 3A, multiple preforms 10 are positioned side-by-side in a container 20 and are supported with preform supports 14. Alternatively, the preforms may be suspended in the container by other means known in the art. (see, e.g., FIG. 6). However, it should be realized that there are many possible configurations of multiple preforms, pre-gates, and/or pre-sprue systems. If fugitive materials are to be removed, a side-by-side configuration provides efficient removal of the fugitive materials.

Although a container may be a mold vessel wherein the infiltration casting process takes place, the container may have more than one opening. For example, in addition to having an opening or port for introducing a preform or a pattern into a container, as well as introducing a slurry or refractory material, a container may have other openings, e.g., it may not include a bottom during this initial step. As shown in FIG. 3A, the container 20 has a filter 22 in the place of the typical solid bottom plate of a mold vessel. The filter 22 may be across substantially the whole cross-sectional surface area of the bottom of the container 20 as shown, or may cover a lesser surface area than the entire bottom cross-sectional area of the container. The filter may be secured by a number of means, including sealing the bottom edge walls of the container adjacent the filter to a vacuum source for removal of the bulk of the vehicle from a slurry of the refractory material. In the example shown in FIG. 3A, the container 20 has a lip around its bottom edge which holds the filter 22 in place, and the container 20 is positioned adjacent a vacuum container 24 that has a vacuum cavity 26 in fluid communication with a vacuum source 28.

Since a filter typically is not self-supporting, preferred embodiments of containers have a perforated bottom and/or side, and/or screen located near or at the end of the container where vehicle removal occurs. In these embodiments, a filter usually is placed in the container over the perforations or screen to provide a finer mesh with which to maintain the refractory material within the container, but allow the vehicle to pass through. Subsequent to removal of the bulk of the vehicle and initial setting of the investment mold material, the investment mold material and pattern assembly preferably is removed from the container and placed in a mold vessel. However, the screen and filter may be removed and an appropriate solid surface sealed to the container to form a mold vessel.

Alternate arrangements for removal of the bulk of the vehicle from an investment material are well within the skill of the art. For example, rather than using a vacuum, a positive pressure source may be used to drive the bulk of the vehicle through the investment material and filter from the opposite direction of the filter. Besides pressure, other means for facilitating a packed refractory material around the preform are within the scope of the invention. In addition, agitation or vibrational forces may be used in conjunction with means for removing the bulk of the vehicle, since agitation will facilitate the packing of a refractory material into a dense bed of particulates.

Returning to FIG. 3A, a slurry of investment material 30 is charged into a container 20 containing prepared preforms 10. As the slurry of investment material 30 is introduced into the container 20, a reduced pressure is created in the vacuum cavity 26 by using the vacuum source 28. The refractory material 32 within the slurry of investment material 30 is allowed to pack to its natural volume fraction of solids which is associated with the particular size and size distribution of the refractory material and state of flocculation during the investment mold formation process. Often the vehicle is removed simultaneously with the introduction of the slurry to the container to prevent premature and/or oversettling of the refractory material. Subsequent to the settling of the refractory material and removal of the bulk of the vehicle, the refractory material begins to become chalk-like in appearance and feel, with the individual particles of the refractory material beginning to interlock. That is, the refractory material becomes much like packed earth or packed sand where the natural packing between particulates and capillary action mechanically secures the particulates together, preventing shifting or flow of the investment mold material.

Figure 4A:
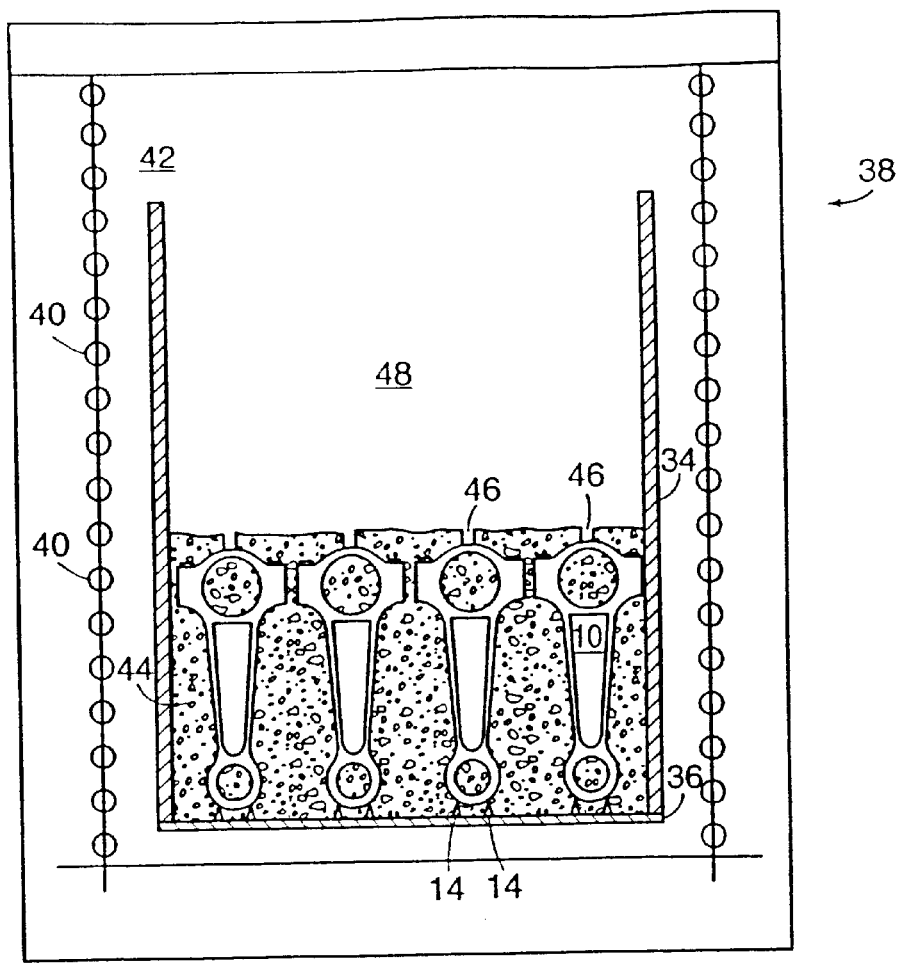
FIGS. 4A and 4B are cross-sectional schematic views of the embodiments of FIGS. 3A and 3B, respectively, in a preheating apparatus where the preforms are encased in an investment mold of the invention subsequent to drying and outgassing of the investment mold materials.

After removal of the bulk of the vehicle 33 as described above, the remaining vehicle may be removed by continued application of reduced and/or positive pressure, and/or application of heat to provide a dried, packed refractory material defining an investment mold. In FIG. 4A, the filter 22 was removed and a solid bottom plate 36 secured to the container where the filter 22 resided prior to placement in a preheating apparatus 38. The bottom plate 36 may be welded to the container to create a mold vessel 34 wherein pressure infiltration with a molten metal will occur, although if moisture is present, it is not the preferred technique.

However, an investment mold material and pattern assembly can be handled while still damp prior to creating a dried, packed refractory material. Accordingly, prior to removal of the remainder of the vehicle from the investment material, the packed refractory material may be sufficiently self-supporting to permit the filter to be removed and a bottom plate secured to the container to create the mold vessel wherein the investment mold material is further dried/cured to produce a dried, packed refractory material which defines an investment mold 44 as shown in FIG. 4A. Alternatively, the investment mold material and pattern assembly can be removed whole from a vehicle removal (de-watering) apparatus and inserted into a pre-prepared mold vessel for further processing.

In embodiments where the container is a mold vessel, or where the investment mold is to be transferred to a mold vessel prior to infiltration, or where no filter is used, there may be no need to secure a solid surface to openings in the container. In addition, it should be realized that any solid surface, not just a material similar to the walls of the container such as a metal plate, may be used to seal openings in the container.

After formation of or placement into a mold vessel, the initially packed refractory material may be dried further. The mold vessel may be heated, often to a temperature of about 300° C., for a time sufficient to remove, e.g., by dissociation and/or evaporation, any remaining vehicle such as water or organic solvents, water of hydration and/or any fugitive coating previously applied to the preforms. In addition, at this stage is the process, the pre-gates, a fugitive pattern, if present, and any fugitive preform supports preferably are dissociated and permitted to evaporate to provide an investment mold defining a mold cavity consisting of the preform with a gate in fluid communication with the mold cavity and interior of the mold vessel.

With reference to FIG. 4A, a preferred embodiment after drying and outgassing is depicted. A mold vessel 34 having a secured bottom plate 36 contains preforms 10 encased in a refractory material which now defines an investment mold 44. Prior to completion of the investment mold 44, the mold vessel 34 is positioned in a preheating apparatus 38, e.g., a furnace. The preheating apparatus 38 serves to dry further the packed refractory material as well as to remove any fugitive materials such as pre-gates, fugitive preform supports, and/or fugitive coatings which may have been present (not shown). Often the preheating apparatus 38 is heated by conventional heat transfer, e.g., using heat transfer tubing 40 surrounding the mold vessel 34. As described further below, the preheating apparatus 38 also may serve to preheat and stage the mold vessel 34 prior to preferred pressure infiltration casting methods. Additionally, the preheating apparatus 38 may be equipped with a vacuum source (not shown) to permit outgassing of the interior of the preheating apparatus 42 during the final stages of investment mold formation.

Again referring to FIG. 4A, the pre-gates were removed to produce the gates 46 which permit fluid communication between the interior of the mold vessel 48 and the preforms 10. As shown, each preform and mold cavity independently is in fluid communication with the interior of the mold vessel. As a result, a molten metal can be forced into the preforms 10 from the interior of the mold vessel 48 during infiltration casting. In this example, the preform supports 14 remain.

Figure 3B:
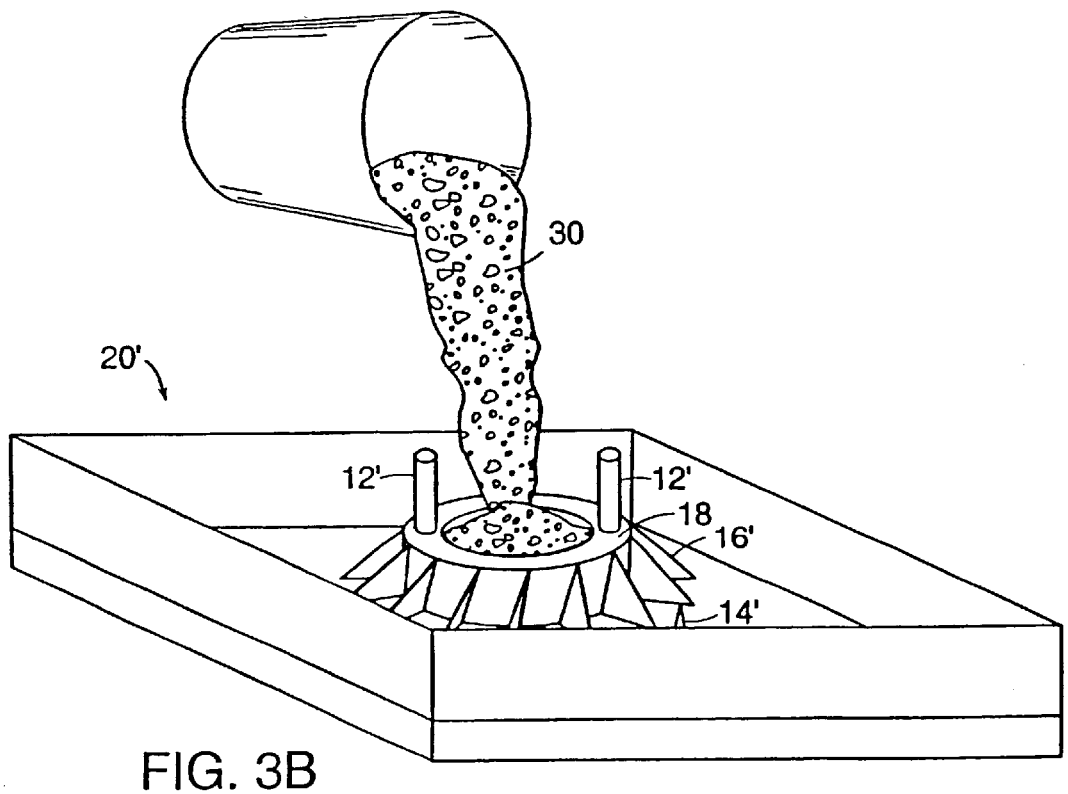

In another embodiment depicted in FIG. 3B, a preform 18 of a gear, having a coating of a mold release agent 16', is placed in a container 20' with pre-gates 12' and preform supports 14' attached to the preform 18. Subsequently, a sufficient amount of a cement slurry of investment material 30' is poured into the container 20' to cover the preform completely and at least a portion of the pre-gates 12'. In these cases where no filter typically is required, agitation of the container is preferred to produce intimate and complete contact between the intricacies of the preform and the refractory material in the cement slurry.

That is, a cement slurry has less vehicle present than a typical slurry of the invention and is more like a concrete mixture, which is a viscous slurry of hydrated structures. A cement slurry typically is a coarser slurry where non-corrosive solvent soluble fine refractory particulates such as magnesium oxide fill in the spaces between the typically coarse castable refractory particles. In this way, an investment mold is formed which is impermeable to molten infiltrants. Unlike other investment molds of the invention, modified ceramic cements are not as amenable to recycling since fresh materials typically need to be added before subsequent reuse.

Figure 4B:
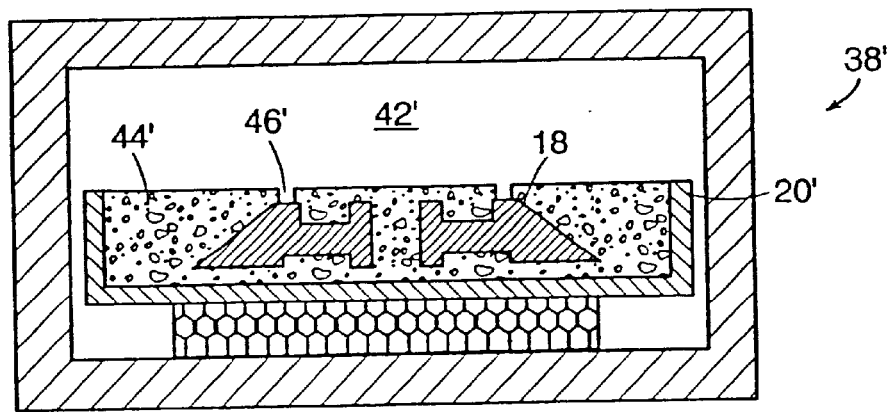

After addition of the cement slurry of investment material to the container, the investment material is cured to remove the water of hydration. As shown in FIG. 4B, the container 20' usually is transferred to a preheating apparatus 38'. After the container is in the preheating apparatus, the investment material typically is subjected to controlled heating to outgas remaining vehicle, fugitive binders, if present, and water of hydration to provide a dried, packed refractory material which defines an investment mold 44'. In addition, pre-gates are removed as described herein to provide gates 46'. Of course the preheating apparatus 38' may include a vacuum source (not shown) in communication with the interior of the preheating apparatus 42'. After formation of the investment mold is complete, the container 20' is removed from the preheating apparatus 38' and loaded into a mold vessel. However, the investment mold material and preform assembly, or investment mold itself, may be handled as described above.

The above principles and concepts also can be applied to forming a mold cavity within an investment mold of the invention using a non-fugitive solid pattern, (i.e., not a preform), e.g., a rubber pattern. In these embodiments, an investment mold preferably is formed using a cement slurry of a modified castable refractory material, i.e., e.g., a castable refractory material including fine particulates of a non-corrosive solvent soluble refractory material. Subsequent to formation of the investment mold, the non-fugitive solid pattern is removed to provide a void mold cavity which can be subjected to infiltration casting to form metal parts. Alternatively, the mold cavity can be filled with a ceramic material prior to infiltration to create an MMC part.

Infiltration Casting Using the Investment Mold

Subsequent to formation of an investment mold, infiltration of the mold cavity and preform, if present, typically is accomplished using infiltration casting methods known in the art. Preferably, the infiltration casting method is a pressure infiltration casting method as described in U.S. Pat.

Nos. 5,322,109; 5,553,658; and 5,983,973; and in International Application No. PCT/US99/01833 (WO 99/38630).

More specifically, WO 99/38630 describes preferred pressure infiltration casting processes used in the practice of the invention which operate at the limit of processing time to increase the throughput of final cast components. That is, high throughput of final metal or MMC parts is achieved in part by heating and evacuating a mold vessel which contains an investment mold and preform, if present, separate from heating of the metal to be cast. As a result, a dedicated source of molten metal is maintained while mold vessels are preheated and staged while awaiting evacuation and introduction of the molten metal to seal a reduced pressure in the mold cavity. Accordingly, this technique of pressure infiltration casting strategically segregates the time restrictive steps of the overall casting process into separate stages which may be conducted simultaneously, thereby avoiding tying up one apparatus during the whole casting process.

In other words, these methods involve separating the individual steps of the pressure infiltration casting process to isolate the steps consuming the greatest length of time. By melting an infiltrant in one vessel and preheating a mold in another vessel the time required to melt the infiltrant is independent of the time required to heat the mold vessel to the appropriate casting temperature. Since heating typically is the longest step in the overall process, the independent heating of an infiltrant and a mold vessel does not occupy expensive machinery or apparatus at this preliminary stage. A dedicated source of molten infiltrant readily can be maintained while multiple mold vessels are heated and staged using standard heat transfer apparatus. Moreover, since these methods use mold vessels as evacuation chambers, the need for a dedicated vacuum chamber either independently or as part of a larger apparatus is eliminated.

Subsequent to the heating stage, a molten infiltrant is charged into a mold vessel after evacuation of the mold cavity. To produce high quality cast parts with low porosity, it usually is necessary to evacuate the mold cavities prior to infiltration of the molten infiltrant. Removal of excess gas in the mold cavities not only reduces the porosity of the finished product but also assists in the filling of the mold cavities since the pressure differential required to drive the molten infiltrant into the mold cavity and preform, if present, is reduced. In addition, the excess gas may become entrapped and compressed within the cast part. Upon heating the cast part, the compressed gas voids expand to form blisters and/or other large void defects at the surface of or within the final cast part.

Figure 5:
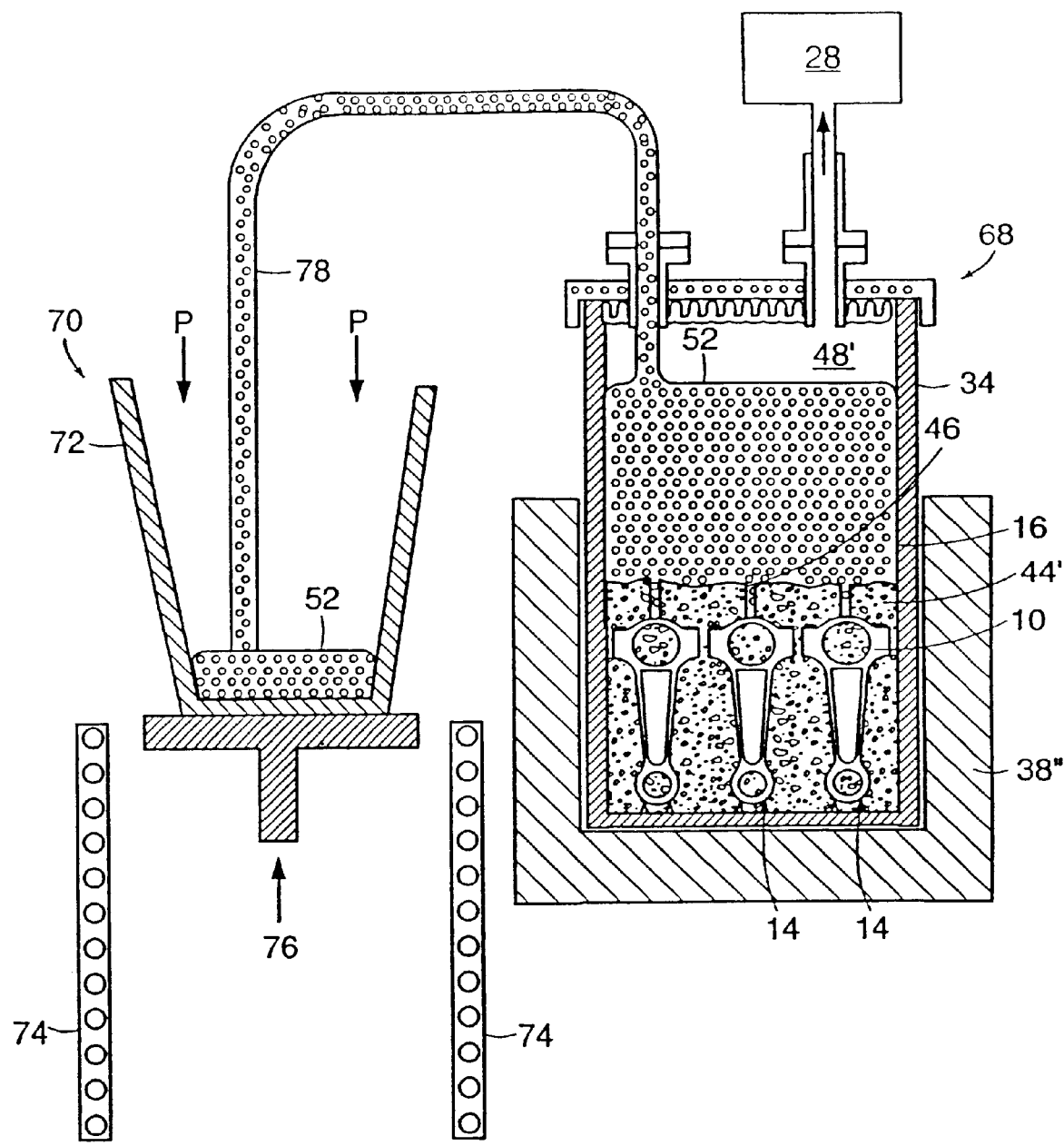
FIG. 5 is a cross-sectional schematic view of a preferred embodiment of pressure infiltration casting during heating, evacuating, and charging of a molten infiltrant into a mold vessel containing an investment mold of the invention with net-shape preforms therein.

With reference to FIG. 5, a preferred method of pressure infiltration casting is depicted during the charging of molten metal into the mold vessel. The set-up includes a mold vessel 34 in a preheating apparatus 38". The mold vessel 34 has a water cooled evacuation cap 68 sealed onto it with an appropriate gasket. The cap 68 has ports to provide fluid communication between the interior of the mold vessel 48' and a vacuum source 28, as well as an independent source of molten metal 70. The independent source of molten metal 70 includes a crucible 72 and heating means 74. A lift mechanism 76 permits the crucible 72 containing molten metal 52 to be moved into contact with a fill snorkel tube 78 which completes the fluid connection between the molten metal 52 and the interior of the mold vessel 48'.

The mold vessel 34 houses an investment mold 44' having prepared preforms 10 disposed therein which define multiple mold cavities. A mold release coating 16 (mold wash) is applied to the mold vessel to prevent interaction between the mold vessel and the molten metal 52 similar to the preparation of a preform. In practice, the mold cavities, containing preforms 10, are evacuated using a vacuum source 28. A charge of molten metal 52 initially not in vacuum communication with the interior of mold vessel 48' then is added into the mold vessel 34 through the fill snorkel tube 78 while maintaining a reduced pressure, i.e., a vacuum, in the mold cavities.

In high throughput casting, the charge of molten metal preferably is added from a source separated from and not in fluid communication with the interior of the mold vessel. Transporting the charge of molten metal into a mold vessel typically involves opening a vacuum seal. The vacuum seal may be a metal foil, other meltable material, valve or other means for sealing a vacuum in the mold vessel. The same or a second vacuum seal also may control the flow of molten metal. However, other means of providing a molten metal into a mold vessel are known that provide a reduced pressure in the mold cavities.

In practice, the charge of molten metal seals a mold cavity from the interior of a mold vessel and maintains a reduced pressure in the mold cavity so that the heated mold vessel containing the molten metal independently can be transferred at atmospheric pressure to a pressure vessel or autoclave. Charging molten metal into a mold vessel typically is a rapid and non-limiting step in respect to overall throughput. Thus, charging a molten metal rapidly can be accomplished, only limited by the number of heated mold vessels and amount of molten metal available. Additionally, no expensive vacuum apparatus is required since the mold vessel acts as an evacuation chamber.

After placing the heated mold vessel containing a molten metal in a pressure vessel, pressure is applied to drive the molten metal into the mold cavity and preform, but not the investment mold. Pressurization is one of the least time consuming steps. Subsequent to infiltration, the molten metal typically is directionally solidified, often with pressure being continually applied during the cooling process to provide a low porosity, highly dense near net-shape part. By certain methods, a low melting temperature material increases heat transfer from the mold vessel which solidifies the molten metal faster, thereby further decreasing the amount of time the pressure vessel is in use. The low melting temperature material has a liquid heat transfer zone which creates a liquid/solid interface with a heat transfer surface. The heat transfer surface, which is in thermal communication with molten metal within a mold cavity, is exposed to the liquid heat transfer zone to solidify the molten metal.

Thus, each step of the process generally is limited in time only with respect to its own requirements. Since infiltration and cooling of a molten infiltrant typically involves a relatively short time period, a pressure vessel will not be occupied for a long time in the overall cycle. Similar to the evacuation stage, one pressure vessel may produce many infiltrated mold cavities and/or finished cast parts in a given amount of time if a sufficient number of mold vessels and sufficient amount of molten infiltrant are available at the beginning of the production process.

An embodiment of a method of the invention includes the use of an assembly line-like set-up which involves mechanical moving means such as conveyor belts and mechanical arms to move a mold vessel and other equipment and components from preheating to cooling stages. This embodiment also may include computerization to control such processes.

Recovery of the Near Net-Shape Metal or MMC Part

After the molten metal infiltrates the mold cavity and preform, if present, and is solidified, the investment mold is removed from the cast part to provide the final metal or MMC part. The cooled mold vessel typically is opened to expose the investment mold containing the cast part(s). Alternatively, the investment mold simply may be removed from the mold vessel without damaging the mold vessel. Subsequently, the investment mold typically is removed using pressurized water, e.g., a pressure washer. Other means for removing the investment mold include, but are not limited to, soaking, acid leading, pressure washing with non-aqueous solvents, abrasive jet washing, and mechanical means. The infiltrated gates, sprue systems, and/or pattern supports are cut or snapped off as in any normal casting process.

The particulates of the removed investment mold preferably are recovered, e.g., using a sump, so that the recovered refractory materials may be used in the formation of another investment mold as described above without further modification of the refractory materials. That is, the refractory materials which make up the investment mold are reusable. Accordingly, the methods of the invention enhance the economics of the entire casting process, especially where an extremely fine refractory material is used which normally may be economically prohibitive.

Subsequent to recovery of the metal or MMC part, further machinery may be required to produce a final net-shape metal or MMC component. Although net-shape metal or MMC part may be provided by methods of the invention, further processing of the part may be necessary where bores, e.g., threaded screws, and/or complex cavities are required which are unachievable by casting processes. Moreover, a minor amount of processing may be required in the areas where gates and/or preform support trivets where present during the casting process.

The recovered cast parts may be processed similar to any cast part as known in the art, e.g., tumbling in an abrasive material to clean the exterior surfaces, and/or machining for matching surfaces, threaded for attachments and/or drilled for appropriate holes or passages.

Figure 6:
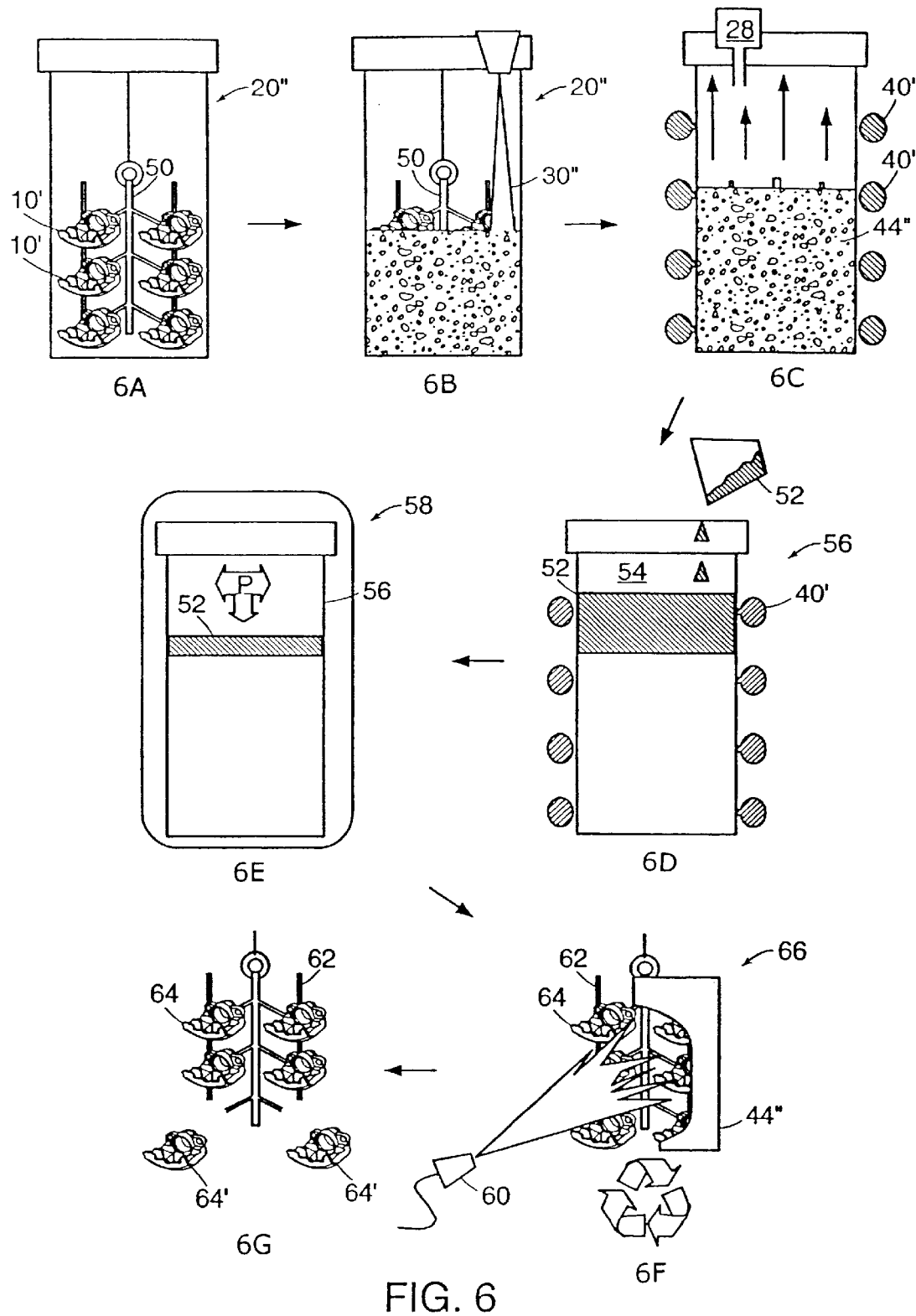
FIGS. 6 (A–G) is a cross sectional schematic view summarizing a preferred method of the invention during the steps of: (A) suspending prepared preforms connected to a pre-gate/pre-sprue system; (B) disposing a slurry of an investment (refractory) material around the preforms and at least a portion of the pre-gate/pre-sprue system; (C) creating a packed refractory material defining an investment mold by removing the vehicle and pre-gate/pre-sprue system; (D) heating, evacuating, and charging molten metal into a mold vessel containing the investment mold and preforms; (E) infiltrating the molten metal into the preforms; (F) removing the investment mold from the infiltrated preforms using pressurized water, and recovering the investment mold compound (refractory material); and (G) detaching the metal matrix composite component from the infiltrated gate/sprue system to provide the final cast part.

The steps of a preferred method of the invention for making near net-shape MMC parts are summarized schematically in FIG. 6. In step A, preforms 10' are connected to a pre-sprue system 50 and suspended in a container 20". Step B shows a slurry of a refractory material 30" being added to the container 20" to encase the preforms 10' and most of the pre-sprue system 50. In step C, the slurry of refractory material is dewatered and dried to form an investment mold 44" containing the preforms (not shown). Heat may be provided via heat transfer tubing 40' surrounding container 20". The pre-sprue system 50 is removed to produce a sprue system (not shown) which provides fluid communication between a molten metal 52 and the preforms 10'.

In step D, a molten metal 52 is charged into the evacuated interior 54 of a heated mold vessel 56 which isolates a reduced pressure in the mold cavities containing the preforms and sprue system (not shown). Step E shows the heated mold vessel 56 which was transferred to and placed in a pressure vessel 58 where a pressure ("P") is applied to the surface of the molten metal 52 to force it through the sprue system and preforms (not shown). Step F depicts a pressure washer 60 removing the investment mold 44" from the infiltrated sprue system 62 and MMC components 64 after the molten metal 52 had solidified and the investment mold assembly 66 was removed from the mold vessel 56. In addition, the investment mold materials are recovered for reuse as shown by the "recycle" symbol. Finally, step G shows the resulting near net-shape MMC components 64' after being removed from the infiltrated sprue system 62.

The invention is illustrated further by the following non-limiting examples.

EXAMPLES

Example 1

Investigation of Suitable Investment Mold Materials

An investigation of suitable investment materials (refractory materials) for use as an investment mold in the practice of the invention was undertaken. Three refractory materials were studied at the outset. These materials were (a) alumina with an average particle size of about 1 $\mu$m; (b) equivalent spherical diameter (ESD) magnesia with an average particle size of about 0.8 $\mu$m; and (c) ESD alumina with an average particle size of about 0.34 $\mu$m. The results of these experiments are presented below.

To evaluate the properties of the refractory materials for use as an investment material for an investment mold of the invention, the investment materials were subjected to infiltration by a molten metal to determine whether infiltration of the dried, packed refractory materials potentially would result in infiltration of an investment mold at a particular externally applied pressure. However, in no way should the results of these investigational experiments limit the scope of the invention, as these examples only are intended to provide guidance as to the ability to evaluate investment mold materials prior to their use in practicing the invention. Moreover, the use of a particular size of a specific investment material for a desired application is dependent on numerous factors, in addition to those studied below, and no conclusions should be drawn based on the results described below.

Example 1A

One Micron Alumina

An alumina test sample was prepared by hand dry packing a mold cavity defined by a graphite mold using alumina with an average particle size of about 1 $\mu$m (K.C. Abrasive, Kansas City, Kans.).

The mold cavity packed with alumina was subjected to standard pressure infiltration casting. That is the graphite mold was positioned in a mold vessel, the mold vessel was heated to at least the casting process temperature of about 720° C., and the mold cavity was evacuated using a vacuum source. The mold cavity then was subjected to infiltration with aluminum alloy A2214 using an externally applied pressure of about 800 pounds per square inch (psi).

Subsequent to solidification and removal of the cast object from the mold cavity, it was determined that the aluminum alloy had infiltrated the hand dry-packed alumina.

Another alumina test sample was prepared by slip casting using an aqueous slurry of about 30% by volume alumina suspended with DARVAN C™ (R.T. Vanderbilt Company, Inc., Norwalk, Conn.) as a dispersant. The pH the resulting suspension was not adjusted, but resulted in a stable fluid suspension. The suspension was cast into a gypsum mold cavity which facilitated the removal of the water from the suspension.

Subsequently, the resulting puck of alumina was loaded into a graphite mold and subjected to standard pressure infiltration casting using an externally applied pressure of about 800 psi as described above. Subsequent to solidification and removal of the sample from the mold cavity, it was determined that a skin of aluminum alloy was present on the exterior of the sample. However, the interior of the sample mold material was not infiltrated.

Example 1B 0.8 Micron ESD Magnesia

A magnesia test sample having an average particle size of about 0.8 μm ESD (Martin Marietta Magnesia Specialties, Baltimore, Md.) generally was prepared by dry packing as described in Example 1A. Subsequent to standard pressure infiltration casting as described in Example 1A, it was determined that the aluminum alloy had completely infiltrated the hand dry-packed magnesia.

Another magnesia test sample was prepared by slip casting as in Example 1A using about 15% by volume magnesia suspended in methyl alcohol (methanol). Due to the low volume fraction of solids and the instability of the suspension, extensive cracking of the sample occurred during drying in the gypsum mold. Nevertheless, the cracked sample was loaded into a graphite mold and subjected to standard pressure infiltration casting as described above. Subsequent to removal of the sample the mold, it was determined that the aluminum alloy infiltrated the cracks in the sample, but the interior of the sample was not infiltrated.

Example 1C 0.34 Micron ESD Alumina

The submicron alumina having an average particle size of about 0.34 μm ESD (Alcoa Industrial Chemicals North America, Bauxite, Ariz.) used in this test study was calcined alumina (as is typical with most alumina particles which are about one micron or less in size. An aqueous slurry of about 35% by volume alumina suspended with DARVAN C™. The amount of DARVAN C was calculated to provide a surface coverage of the alumina of about 0.4 mg/m², assuming the surface area of the alumina was about 10 m²/g. The resulting suspension was divided into three samples and the pH of each sample was adjusted, if necessary, to determine the effect of various levels of dispersion on the behavior of the investment mold materials during pressure infiltration casting. The pH was adjusted appropriately using aqueous solutions of hydrochloric acid (HCl) and/or ammonium hydroxide (NH$_4$OH). The pH's investigated were approximately 3, 6, and 9.

pH of About 3

After the pH was adjusted to about 3, the resulting suspension was extremely thick. It is believed that the low pH causes the alumina particles to be attracted to each other causing the suspension to be flocculated. An alumina test sample was prepared by slip casting the pH~3 alumina suspension as in Example 1A. Subsequent to pressure infiltration casting as in Example 1A, it was determined that the aluminum alloy had formed a skin around the exterior of the submicron alumina sample. However, after the aluminum alloy skin was removed, the interior of the sample was not infiltrated and the alumina remained as a powder which could be redispersed into water.

pH of About 6

After the pH was adjusted to about 6, the resulting suspension had a noticeable increase in viscosity, but still was readily flowable. An alumina test sample was prepared by slip casting the pH~6 alumina suspension as in Example 1A. Subsequent to pressure infiltration casting as in Example 1A, the aluminum alloy infiltrant formed a skin around the exterior of the submicron alumina sample. However, after the aluminum alloy skin was removed, the interior of the sample was not infiltrated and the alumina remained as a loose powder which readily could be redispersed into water.

pH of About 9

The pH of the initially prepared suspension was about 9 so no adjustment was necessary. The suspension had a low viscosity and readily was flowable. An alumina test sample was prepared by slip casting the pH~9 alumina suspension as in Example 1A. Subsequent to pressure infiltration casting as in Example 1A, the results were similar to those of the sample having a pH of about 6.

Example 2

Use of an Investment Mold of the Invention to Produce Engine Connecting Rods

Engine connecting rods were prepared using two techniques described above, i.e., dry packing, and slip casting. Initially, a net-shape preform of the connecting rod was provided using the three-dimensional printing technique described above. The preform was composed of alumina having an average particle size of about 30 μm.

In the first case, the preform was dry packed into alumina having an average particle size of about 1 μm. During standard pressure infiltration casting as described above in Example 1A, the investment mold material was infiltrated and the connecting rod was embedded into the investment mold.

In the second case, the preform was encased in a slip cast shell of alumina having an average particle size of about 0.34 μm. More specifically, the preform was supported on ceramic support trivets in a shallow box. Styrofoam pre-gates were attached to the top side of the preform using glue. An aqueous slurry of the alumina at a pH of about 9 was poured into the box to completely surround the preform and a portion of the pre-gates.

The slip cast alumina formed a low porosity casing around the preform. Blocks containing the preforms and investment material were stacked into a steel mold vessel. The resulting composition was subjected to standard pressure infiltration casting as described above, up to an externally applied pressure of about 800 psi. As a result, molten aluminum entered the preform through a gate which was in fluid communication with the preform to produce a fully infiltrated preform, i.e., a net-shape metal matrix composite component. In addition, a skin of aluminum was formed around the investment mold material encasing the preform, but did not enter into the alumina casing. The casing was punctured, which permitted the investment mold material to be removed from the connecting rod using pressure washing with water.

Example 3

Formation of an Investment Mold Using Conventional Refractory Cement Materials With Investment Refractory Materials of the Invention To form the slurry for investment casting of a preform or suitable pattern of a component, about 235 g of modified calcium aluminate cement (CaO-Al$_2$O$_3$, SiC, and fused SiO$_2$) and about 230 g of magnesium oxide (MgO) were mixed in about 60 g of water. After dispersing the particulates in the water, a cement slurry of investment material was charged to a container having therein a rubber pattern.

During the introduction of the investment material into the container, the container was subjected to vibrational forces under reduced pressure.

Subsequent to preliminary solidification of the investment material, the resulting investment mold was removed from the rubber pattern using low air pressure. The investment mold was cured for about 24 hr at room temperature, further dried at about 40° C., then heated to a temperature of about 600° C. over about 24 hr at a rate of about 1° C/min. The interior of the resulting investment mold was slip coated with a graphite-based coating material. The mold cavity then was filled with a slurry of a reinforcement particulate (preform particulate), dried, and subjected to pressure infiltration casting as described above in Example 1A.

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are intended to be embraced therein.

Each of the patent documents and scientific publications disclosed hereinabove is incorporated by reference herein.

What is claimed is:

1. A method of producing a metal matrix composite component comprising the steps of:
   (a) providing a net-shape preform having a preform breakthrough pressure;
   (b) positioning a pre-gate adjacent to the net-shape preform;
   (c) disposing a slurry of a refractory material and a vehicle around at least a portion of the pre-gate and the net-shape preform positioned within a container, wherein the refractory material comprises particles having an average particle size less than an average particle size of particles associated with the net-shape preform;
   (d) removing the vehicle to create a dried, packed refractory material defining an investment mold having a mold breakthrough pressure, wherein the mold breakthrough pressure is greater than the preform breakthrough pressure;
   (e) removing the pre-gate to provide a gate in fluid communication with the net-shape preform;
   (f) infiltrating the net-shape preform through the gate with a molten metal;
   (g) cooling the molten metal which infiltrated the net-shape preform; and
   (h) removing the investment mold from the metal matrix composite component.

2. The method of claim 1 wherein the net-shape preform is made by a three-dimensional printing technique, a machining technique, or combinations thereof.

3. The method of claim 1 wherein the net-shape preform comprises a coating.

4. The method of claim 1 wherein the net-shape preform further comprises a machinable material.

5. The method of claim 1 wherein the average particle size of the net shape preform is about two times greater than the average particle size of the refractory material.

6. The method of claim 1 wherein the net-shape preform is sintered.

7. The method of claim 1 further comprising the steps of:
   (i) evacuating the container; and
   (ii) heating the container.

8. The method of claim 7 wherein the preform in the investment mold defines a mold cavity, the method further comprising the steps of:
   (iii) introducing the molten metal into the container to isolate a reduced pressure in the mold cavity; and
   (iv) transferring the container containing the molten metal to a pressure vessel for the step of infiltrating.

9. The method of claim 1 further comprising the steps of:
   (i) removing the investment mold containing the net-shape preform from the container; and
   (ii) positioning the investment mold containing the net-shape preform in a mold vessel.

10. The method of claim 1 further comprising the step of:
    (i) reusing the refractory material after removing the investment mold.

11. The method of claim 1 further comprising the step of:
    (i) machining the metal matrix composite component.

12. The method of claim 1 wherein between the steps of removing the vehicle and infiltrating the net-shape preform, the net-shape preform remains unsintered.

13. The method of claim 1 wherein the refractory material is graphite.

14. A method of producing a metal matrix composite component comprising the steps of:
    (a) providing a container having a filter disposed over an opening of the container;
    (b) attaching a pre-gate adjacent to a net-shape preform comprising a coating, wherein the net-shape preform has a breakthrough pressure;
    (c) disposing a slurry of a refractory material and a vehicle around at least a portion of the pre-gate and the net-shape preform positioned within the container, wherein the refractory material comprises particles having an average particle size less than an average particle size of particles associated with the net-shape preform;
    (d) removing a majority of the vehicle through the filter using pressure;
    (e) removing the filter to expose the opening of the container and sealing the opening to form a mold vessel;
    (f) drying the refractory material to create a dried, packed refractory material defining an investment mold having a breakthrough pressure, the investment mold defining a mold cavity containing the net-shape preform;
    (g) removing the pre-gate to provide a gate in fluid communication with the mold cavity;
    (h) heating the mold vessel to at least the temperature of the casting process, and evacuating the mold cavity;
    (i) providing a molten metal over the gate to isolate a reduced pressure in the mold cavity;
    (j) applying pressure greater than the breakthrough pressure of the net-shape preform and less than the breakthrough pressure of the investment mold to force the molten metal through the gate into the mold cavity and the net-shape preform;
    (k) cooling the molten metal which infiltrated the net-shape preform to produce a metal matrix composite component; and
    (l) removing the investment mold from the metal matrix composite component.

15. The method of claim 14 herein the step of removing the majority of the vehicle using pressure comprises using vacuum pressure.

16. The method of claim 14 wherein the step of sealing the opening of the container comprises securing a solid surface to the container.

17. The method of claim 14 further comprising the steps of:
(i) removing the investment mold containing the net-shape preform from the container; and
(ii) positioning the investment mold containing the net-shape preform in a mold vessel.

18. The method of claim 14 wherein the step of cooling the molten metal is unidirectional cooling.

19. The method of claim 14 wherein the step of removing the investment mold comprises pressure washing.

20. The method of claim 14 wherein the net-shape preform is sintered.

21. A method of producing a metal matrix composite component comprising the steps of:
(a) positioning a pre-gate adjacent to a net-shape preform having a preform breakthrough pressure defined by a porosity of the net-shape preform;
(b) disposing a slurry of a refractory material and a vehicle around at least a portion of the pre-gate and the net-shape preform;
(c) removing the vehicle to create an investment mold having a mold breakthrough pressure defined by a porosity of the investment mold, wherein the mold breakthrough pressure is greater than the preform breakthrough pressure;
(d) removing the pre-gate to provide a gate in fluid communication with the net-shape preform;
(e) infiltrating the net-shape preform through the gate with a molten metal;
(f) cooling the molten metal which infiltrated the net-shape preform to form a metal matrix composite component; and
(g) removing the investment mold from the metal matrix composite component.

22. The method of claim 21 wherein the net-shape preform is made by a three-dimensional printing technique, a machining technique, or a combination thereof.

23. The method of claim 21 wherein the net-shape preform comprises a coating.

24. The method of claim 21 wherein the net-shape preform comprises a machinable material.

25. The method of claim 21 wherein the net-shape preform comprises particles having an average particle size about two times greater than an average particle size of the refractory material.

26. The method of claim 21 wherein the net-shape preform is sintered.

27. The method of claim 21 further comprising the step of machining the metal matrix composite component.

28. The method of claim 21 wherein the net-shape preform comprises particles having an average particle size greater than the average particle size of the refractory material.

29. The method of claim 21 wherein the refractory material is graphite.

30. The method of claim 21 wherein the refractory material is zirconium silicate.

* * * * *